United States Patent
Nakayama et al.

(10) Patent No.: US 12,104,017 B2
(45) Date of Patent: Oct. 1, 2024

(54) POLYAMIC ACID AND METHOD FOR PRODUCING SAME, POLYAMIC ACID SOLUTION, POLYIMIDE, POLYIMIDE FILM, LAMINATE AND METHOD FOR PRODUCING SAME, AND FLEXIBLE DEVICE AND METHOD FOR PRODUCING SAME

(71) Applicant: KANEKA CORPORATION, Osaka (JP)

(72) Inventors: Hirofumi Nakayama, Shiga (JP); Mari Uno, Shiga (JP)

(73) Assignee: KANEKA CORPORATION, Osaka (JP)

( * ) Notice: Subject to any disclaimer, the term of this patent is extended or adjusted under 35 U.S.C. 154(b) by 988 days.

(21) Appl. No.: 17/037,012

(22) Filed: Sep. 29, 2020

(65) Prior Publication Data
US 2021/0009760 A1    Jan. 14, 2021

Related U.S. Application Data

(63) Continuation of application No. PCT/JP2019/010718, filed on Mar. 14, 2019.

(30) Foreign Application Priority Data

Mar. 30, 2018 (JP) ................. 2018-069414

(51) Int. Cl.
| | |
|---|---|
| *C08G 73/10* | (2006.01) |
| *B32B 27/28* | (2006.01) |
| *C08G 77/455* | (2006.01) |
| *C08J 5/18* | (2006.01) |

(52) U.S. Cl.
CPC ........ *C08G 73/1007* (2013.01); *B32B 27/281* (2013.01); *C08G 73/106* (2013.01); *C08G 73/1067* (2013.01); *C08G 73/1082* (2013.01); *C08G 77/455* (2013.01); *C08J 5/18* (2013.01); *B32B 2250/02* (2013.01); *B32B 2307/306* (2013.01); *B32B 2307/412* (2013.01); *B32B 2457/202* (2013.01); *B32B 2457/204* (2013.01); *B32B 2457/206* (2013.01); *B32B 2457/208* (2013.01)

(58) Field of Classification Search
CPC .............. C08G 73/1042; C08J 2379/08; C08J 2479/00; C08L 79/08; C08L 83/04
See application file for complete search history.

(56) References Cited

U.S. PATENT DOCUMENTS

| | | |
|---|---|---|
| 2004/0197699 A1 | 10/2004 | Nakayama et al. |
| 2013/0178597 A1 | 7/2013 | Takasawa et al. |
| 2018/0163005 A1 | 6/2018 | Hosogai et al. |

FOREIGN PATENT DOCUMENTS

| | | | |
|---|---|---|---|
| CN | 105906813 A | | 8/2016 |
| CN | 107428146 A | | 12/2017 |
| JP | 2002-161136 A | | 6/2002 |
| JP | 2012-041530 A | | 3/2012 |
| JP | WO 2014098235 | * | 6/2014 |
| JP | 2016-029126 A | | 3/2016 |
| JP | 5948545 B2 | | 7/2016 |
| JP | 2017-226847 A | | 12/2017 |

(Continued)

OTHER PUBLICATIONS

International Preliminary Report on Patentability issued in International Application No. PCT/JP2019/010718, mailed Oct. 15, 2020 (7 pages).
Office Action issued in corresponding Japanese Patent Application No. 2020-509916, dated Jan. 10, 2023, with translation (7 pages).
International Search Report issued in International Application No. PCT/JP2019/010718, mailed Jun. 11, 2019 (2 pages).

(Continued)

*Primary Examiner* — Gregory Listvoyb
(74) *Attorney, Agent, or Firm* — Osha Bergman Watanabe & Burton LLP

(57) ABSTRACT

A polyamic acid according to one or more embodiments of the present invention contains a structural unit represented by general formula (1) and a structural unit represented by general formula (2). In general formula (1), the plurality of $R^1$s are each independently a hydrogen atom, a monovalent aliphatic group or an aromatic group. In general formula (2), the plurality of $R^2$s are each independently an alkyl group having 1-3 carbon atoms or an aryl group having 6-10 carbon atoms. In general formulas (1) and (2), X is a tetravalent organic group. In general formula (2), the plurality of Ys are each independently an alkylene group having 1-3 carbon atoms or an arylene group having 6-10 carbon atoms, and m is an integer of 51-199.

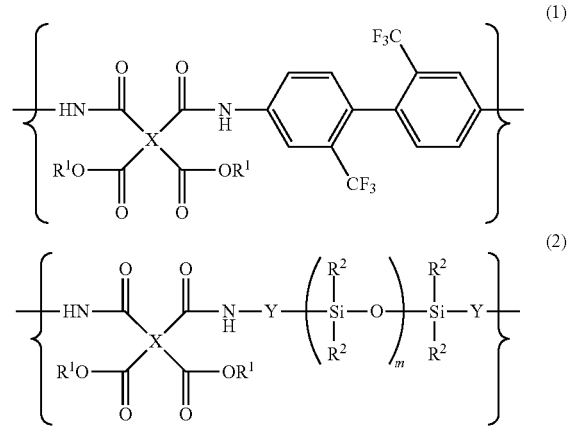

9 Claims, No Drawings

(56) References Cited

FOREIGN PATENT DOCUMENTS

| | | | |
|---|---|---|---|
| JP | 2019-077863 A | | 5/2019 |
| KR | 101787941 | * | 10/2017 |
| TW | 306881 B | | 3/2009 |
| TW | 201315772 A | | 4/2013 |
| WO | 2013047451 A1 | | 4/2013 |
| WO | 2014/098235 A1 | | 6/2014 |
| WO | 2015/198970 A1 | | 12/2015 |

OTHER PUBLICATIONS

Written Opinion issued in International Application No. PCT/JP2019/010718, mailed Jun. 11, 2019 (4 pages).
Office Action in corresponding Chinese Patent Application No. 201980024265.6 dated Sep. 19, 2022 (10 pages).

* cited by examiner

POLYAMIC ACID AND METHOD FOR PRODUCING SAME, POLYAMIC ACID SOLUTION, POLYIMIDE, POLYIMIDE FILM, LAMINATE AND METHOD FOR PRODUCING SAME, AND FLEXIBLE DEVICE AND METHOD FOR PRODUCING SAME

TECHNICAL FIELD

One or more embodiments of the present invention relate to polyamic acid, polyamic acid solution, polyimide, and polyimide film, and a flexible device using the polyimide film.

BACKGROUND

Devices such as displays such as liquid crystal displays, organic EL displays and electronic papers, solar cells, touch panels, and lighting devices are required to be thin, lightweight and flexible, and use of plastic film substrates instead of glass substrates is under consideration. In the process for producing an electronic device, electronic elements such as a thin-film transistor and a transparent electrode are arranged on the substrate. Since formation of an electronic element requires a high temperature process, and a plastic film substrate is required to have heat resistance allowing the substrate to adapt to a high-temperature process, use of polyimide as a material for the plastic film substrate is under consideration.

The process for producing electronic devices is classified into a batch type and a roll-to-roll type. In the batch process, a resin solution may be applied onto a glass support, and dried to form a laminate of the glass support and a film substrate, followed by forming an element on the laminate, and then peeling the film substrate from the glass support, and current process equipment for glass substrates can be used. When the film substrate is made of polyimide, a laminate of a support and a polyimide film can be obtained by applying a polyamic acid solution as a polyimide precursor onto the support, and heating the polyamic acid together with the support to perform imidization.

In an optical device such as a display, light emitted from the element exits through the film substrate, and therefore the substrate material is required to have transparency. A polyimide using a monomer having a rigid structure or a fluorine-based monomer is known to have high transparency and a low thermal expansion property (Patent Documents 1 and 2). Use of silicone as a material for polyimide is known to reduce stress at an interface between a glass support and a polyimide film (Patent Documents 3 and 4).

PATENT DOCUMENTS

Patent Document 1: Japanese Patent Laid-open Publication No. 2002-161136
Patent Document 2: Japanese Patent Laid-open Publication No. 2012-41530
Patent Document 3: Japanese Patent Laid-open Publication No. 2017-226847
Patent Document 4: Japanese Patent No. 5948545

SUMMARY

The polyimides disclosed in Patent Documents 3 and 4 are excellent in transparency, but have a low thermal decomposition temperature, and thus may cause reduction of productivity contamination of a production apparatus and the like due to generation of outgas, etc. from a polyimide film during formation of electronic elements. One or more embodiments of the present invention are to provide a polyimide film excellent in transparency and heat resistance, and a polyamic acid as a precursor thereof.

One or more embodiments of the present invention are related to a polyamic acid containing a structural unit represented by the following general formula (1) and a structural unit represented by the following general formula (2).

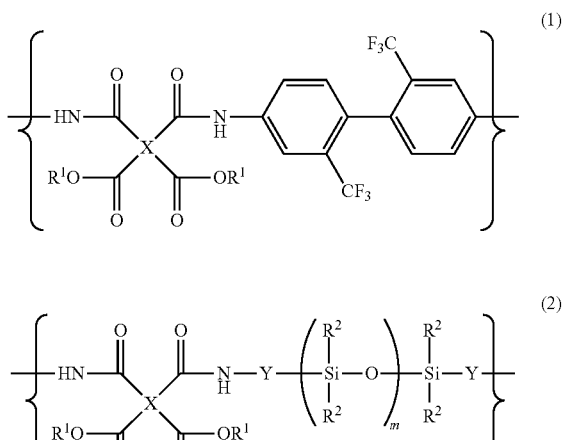

The polyamic acid can be obtained by, for example, reacting a tetracarboxylic dianhydride and a diamine in an organic solvent. When 2,2'-bis(trifluoromethyl)benzidine (TFMB) and a silicone diamine represented by the following general formula (3) are used as diamines, a polyamic acid having a structural unit represented by the general formula (1) and a structural unit represented by the general formula (2) can be obtained.

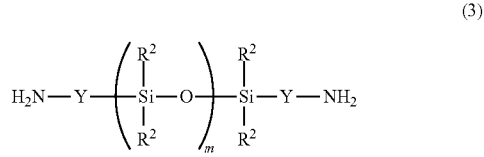

In the general formulae (2) and (3). $R^2$s are each independently an alkyl group having 1 to 3 carbon atoms, or an aryl group, with a methyl group being preferable. Ys are each independently an alkylene group having 1 to 3 carbon atoms, or an arylene group, with a propylene group being preferable. m is an integer of 51 to 199.

In the general formulae (1) and (2), $R^1$s are each independently a hydrogen atom, an alkyl group, or an aryl group, with a hydrogen atom being preferable. The tetravalent organic group X is a residue of the tetracarboxylic dianhydride. The polyamic acid may contain, for example, the following structures (A), (B) and (C) as the organic group X. In one or more embodiments, the polyamic acid contains structures (A) and/or (B), and (C), as the organic group X.

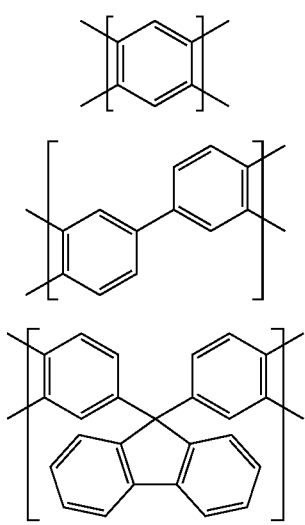

In one or more embodiments, the polyamic acid contains an organic group in which X in the general formulae (1) and (2) is the structure (C), and the ratio of the structure (C) to the total amount of X is 30 mol % or more.

The polyamic acid may be a block copolymer. Examples of the block copolymer include block copolymers having a first segment which contains the structural unit represented by the general formula (1) and does not contain the structural unit represented by the general formula (2), and a second segment containing the structural unit represented by the general formula (2). The block copolymer may be an ABA type triblock copolymer in which the second segment is bonded to both ends of the first segment.

The block copolymer can be obtained by, for example, reacting a tetracarboxylic dianhydride with a first diamine in an organic solvent to form a polyamic acid segment, and then adding a second diamine. When the first diamine contains TFMB, and the second diamine contains a silicone diamine, an ABA type triblock copolymer can be obtained in which the second segment is bonded to both ends of the first segment. The amount (the number of moles) of the tetracarboxylic dianhydride in formation of the polyamic acid segment (first segment) by reaction of the tetracarboxylic dianhydride with the first diamine is equal to or more than 1.01 times and less than 1.10 times the amount (the number of moles) of the first diamine.

The polyamic acid solution contains the polyamic acid and an organic solvent. A polyimide can be obtained by cyclodehydration of the polyamic acid. The polyimide film includes the polyimide. In one or more embodiments, a polyamic acid solution is applied to a support to form a laminate with a film-shaped polyamic acid disposed on the support, and the laminate is heated to imidize the polyamic acid.

The 1% weight-reduction temperature of the polyimide film may be 450° C. or higher. The glass transition temperature of the polyimide film is may be 300° C. or higher. In some embodiments, laminate of the support and the polyimide film has a residual stress of 25 MPa or less at room temperature.

A flexible device can be obtained by forming an electronic element on the polyimide film. An electronic element may be formed on the polyimide film of the laminate with the polyimide film disposed on the support, followed by peeling the polyimide film from the support.

The polyimide film gives a laminate having small residual stress when laminated with an inorganic support, and is excellent in heat resistance and transparency, and suitable as a substrate material for an electronic device required to have transparency.

DETAILED DESCRIPTION OF THE EMBODIMENTS

One or more embodiments of the present invention will be described below, but one or more embodiments of the present invention are not limited to the embodiments.

A polyamic acid can be obtained by polyaddition reaction of a tetracarboxylic dianhydride and a diamine, and a polyimide can be obtained by cyclodehydration reaction of the polyamic acid. In other words, polyimide is a polycondensation reaction product of the tetracarboxylic dianhydride with the diamine.

Polyamic Acid

The polyamic acid according to one or more embodiments of the present invention contains a structural unit represented by the following general formula (1) (hereinafter, sometimes referred to as "structural unit 1"), and a structural unit represented by the following general formula (2) (hereinafter, sometimes referred to as "structural unit 2").

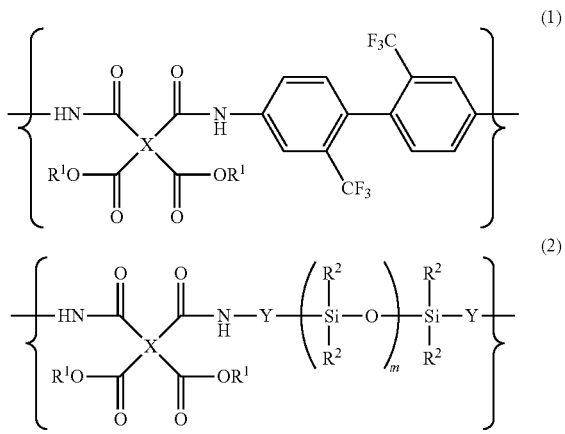

The structural unit 1 is formed by reaction of 2,2'-bis(trifluoromethyl)benzidine (TFMB) with a tetracarboxylic dianhydride having a tetravalent organic group X. The structural unit 2 is formed by reaction of a silicone diamine represented by the following general formula (3) with a tetracarboxylic dianhydride having a tetravalent organic group X.

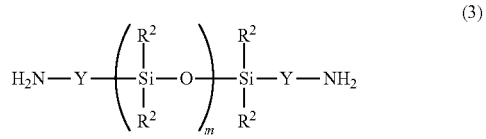

In the general formulae (1) and (2), X is a tetravalent organic group, which is a residue of the tetracarboxylic dianhydride. $R^1$s are each independently a hydrogen atom, a monovalent aliphatic group or an aromatic group. In the polyamic acid obtained by reaction of a tetracarboxylic dianhydride with a diamine, $R^1$ is a hydrogen atom. By esterifying the carboxy group of the polyamic acid, a polyamic acid (polyamic acid ester) can be obtained in which $R^1$ is an alkyl group or an aryl group. The polyamic acid ester is hardly hydrolyzed, and a solution thereof is excellent in stability.

In the general formulae (2) and (3), $R^2$s are each independently an alkyl group having 1 to 3 carbon atoms, or an aryl group. Y's are each independently an alkylene group having 1 to 3 carbon atoms, or an arylene group. m is an integer of 51 to 199.

When the structural unit 1 is contained, the transparency of the polyimide film obtained by imidization of the polyamic acid can be improved. From the viewpoint of transparency, heat resistance, mechanical strength, low residual stress, low moisture absorption and low water absorption of the polyimide film, the content of the structural unit represented by the general formula (1) in the polyamic acid may be 60 to 99.7 mol %, 70 to 99.5 mol %, 80 to 99.3 mol %.

When the structural unit 2 is contained, the heat resistance of the polyimide film obtained by imidization of the polyamic acid can be improved. The content of the structural unit represented by the general formula (2) in the polyamic acid may be 0.3 to 7 mol %, 0.5 to 5 mol %, 0.7 to 4 mol %.

The polyamic acid may contain a structural unit other than the structural unit 1 and the structural unit 2. The content of the structural unit other than the structural unit 1 and the structural unit 2 may be 29 mol % or less, 20 mol % or less, 10 mol % or less or 5 mol % or less, and the polyamic acid may be composed of only the structural unit 1 and the structural unit 2.

The weight average molecular weight of the polyamic acid may be, for example, 10,000 to 1,000,000, 30,000 to 500,000, 40,000 to 100,000. When the weight average molecular weight is 10,000 or more, the mechanical strength of the polyimide film can be secured. When the weight average molecular weight is 1,000,000 or less, the polyamic acid has sufficient solubility in a solvent, and a coating film or a film having a smooth surface and a uniform thickness can be obtained. The molecular weight is a value calculated in terms of polyethylene oxide, which is obtained by gel permeation chromatography (GPC).

Tetracarboxylic Dianhydride

In the general formulae (1) and (2), the organic group X is a residue of a tetracarboxylic dianhydride, which is a tetravalent organic group derived from the tetracarboxylic dianhydride used for polymerization of a polyamic acid.

Specific examples of the tetracarboxylic dianhydride, pyromellitic dianhydride, 3,3'4,4'-biphenyltetracarboxylic acid, 1,4-phenylenebis(trimellitate dianhydride), 2,3,6,7-naphthalenetetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 4,4'-oxydiphthalic dianhydride, 9,9-bis(3,4-dicarboxyphenyl)fluorenic dianhydride, 4,4'-(hexafluoroisopropylidene)diphthalic anhydride, dicyclohexyl-3,3',4,4'-tetracarboxylic dianhydride, 1,2,4,5-cyclohexanetetracarboxylic dianhydride, cyclobutanetetracarboxylic dianhydride, 2'-oxodispiro[2.2.1]heptane-2,1''-cycloheptane-3,2''-bicyclo[2.2.1]heptane-5,5'-6,6'-tetracarboxylic acid. When a plurality of tetracarboxylic dianhydrides are used, a polyamic acid having a plurality of organic groups X in the general formulae (1) and (2) can be obtained.

Among the exemplified tetracarboxylic dianhydrides, pyromellitic dianhydride (PMDA) and 3,3'4,4'-biphenyltetracarboxylic acid (BPDA) may be used from the viewpoint of improving the heat resistance and the mechanical strength of the polyimide film. From the viewpoint of improving the transparency (reducing the yellow index) of the polyimide film, a tetracarboxylic dianhydride having a bend structure, such as 9,9-bis(3,4-dicarboxyphenyl)fluorenic dianhydride (BPAF), 4,4'-(hexafluoroisopropylidene)diphthalic anhydride (6FDA) or 4,4'-oxyphthalic dianhydride (OPDA), may be used as the tetracarboxylic dianhydride. Among these, BPAF may be used because the birefringence of the polyimide film can be reduced.

From the viewpoint of obtaining a polyimide film having excellent heat resistance and low birefringence, PMDA and/or BPDA, and BPAF may be used as the tetracarboxylic dianhydride. The residue of PMDA is a tetravalent organic group represented by the formula (A), the residue of BPDA is a tetravalent organic group represented by the formula (B), and the residue of BPAF is a tetravalent organic group represented by the formula (C).

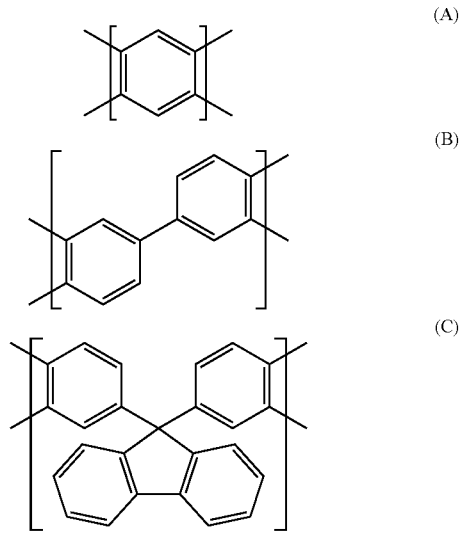

In other words, the polyamic acid may contain one or more selected from the group consisting of a tetravalent organic group represented by the formula (A) and a tetravalent organic group represented by the formula (B), and a tetravalent organic group represented by the formula (C), as tetracarboxylic dianhydride-derived structures (organic groups X in the general formulae (1) and (2)). A combination of tetracarboxylic dianhydrides may be PMDA and BPAF, and in this case, the polyamic acid contains a tetravalent organic group represented by the formula (A) and a tetravalent organic group represented by the formula (C), as organic groups X in the general formulae (1) and (2).

From the viewpoint of improving the transparency and the heat resistance and reducing the birefringence and the residual stress of the polyimide film, the total amount of PMDA, BPDA and BPAF may be 60 mol % or more, 70 mol %, 80 mol % or more, based on a total of 100 mol % of tetracarboxylic dianhydride components in the polyamic acid. The total amount of PMDA, BPDA and BPAF may be 90 mol % or more, or 100 mol %.

From the viewpoint of obtaining a polyimide film having low birefringence, the amount of BPAF based on a total of 100 mol % of tetracarboxylic dianhydride components in the polyamic acid may be 30 mol % or more, such as 35 mol % or more, 40 mol % or more.

From the viewpoint of obtaining a polyimide film excellent in heat resistance, the total amount of PMDA and BPDA based on a total of 100 mol % of tetracarboxylic dianhydride components in the polyamic acid may be 10 mol % or more, such as 20 mol % or more, 30 mol % or more.

When the tetracarboxylic dianhydride is a combination of PMDA and BPAF, the amount of BPAF based on the total amount of PMDA and BPAF may be 30 to 90 mol %, such as 35 to 70 mol %, 40 to 60 mol % from the viewpoint of obtaining a polyimide film having high transparency and low birefringence.

Diamine

As the diamine, 2,2'-bis(trifluoromethyl)benzidine (TFMB) and a silicone diamine are used. By using TFMB as the diamine, the structural unit 1 is formed. The amount of TFMB based on a total of 100 mol % of diamine components in the polyamic acid may be 60 to 99.7 mol %, 70 to 99.5 mol %, 80 to 99.3 mol %.

By using a silicone diamine represented by the general formula (3) as the diamine, the structural unit 2 is formed. The silicone diamine represented by the general formula (3) is a diamine derived from a silicone compound (silicone modified with amino at both ends). Specific examples of the alkylene group Y in the general formulae (2) and (3) include an ethylene group, a propylene group and a phenylene group, with a propylene group being preferable. Examples of $R^2$ include a methyl group, an ethyl group, a propyl group and a phenyl group. $R^2$ may be an alkyl group, more preferably a methyl group, because excellent heat resistance is obtained, and thermal decomposition hardly occurs at a heating temperature during imidization and element formation.

When the silicone is a long-chain silicone in which the number of siloxane structure repeating units (m) is 51 or more, microdomains are easily formed, so that a polyimide film having a high thermal decomposition temperature and excellent heat resistance can be obtained. When the number of repeating units (m) is less than 200, the solubility of the polyamic acid solution can be maintained, and therefore a polyimide film having high transparency and a small haze can be obtained. The number of repeating units (m) may be less than 160, or less than 80.

Specific examples of the silicone diamine include methylphenyl silicone modified with amino at both ends, dimethyl silicone modified with amino at both ends (e.g. "KF-8012" (number average molecular weight: 4,400) and "KF-8008" (number average molecular weight: 11,400) manufactured by Shin-Etsu Chemical Co., Ltd.); and "Silaplane FM-3321" (number average molecular weight: 5,000) manufactured by CHISSO CORPORATION. From the viewpoint of improving the heat resistance of the polyimide film and reducing the residual stress in the laminate of the polyimide film and the inorganic support, dimethyl silicone modified with amino at both ends may be used.

The amount of the silicone diamine represented by the general formula (3) may be 0.3 to 7 mol %, 0.5 to 5 mol %, 0.7 to 4 mol % based on a total of 100 mol % of diamine components in the polyamic acid. The copolymerization ratio of the silicone diamine may be in the range of 2 to 30 mass % 5 to 25 mass %, 10 to 20 mass %, based on the mass of the polyamic acid (total amount of tetracarboxylic dianhydrides and diamines). When the amount of the silicone diamine in which the number of siloxane structure repeating units (m) is within the range of 51 to 199 is in the above-described range, a polyimide film obtained by imidization of the polyamic acid is excellent in heat resistance and transparency, and a laminate of the polyimide film and an inorganic substrate material such as glass tends to have small residual stress.

The polyamic acid of one or more embodiments may contain a structural unit other than the structural unit 1 and the structural unit 2 as long as the performance thereof is not impaired. In other words, a diamine component other than TFMB and the silicone diamine may be contained as the diamine component. Examples of the diamine include 1,4-diaminocyclohexane, 1,4-phenylenediamine, 1,3-phenylenediamine, 4,4'-oxydianiline, 3,4'-oxydianiline, 2,2'-bis (trifluoromethyl)-4,4'-diaminodiphenyl ether, 4,4'-diaminobenzanilide, 4'-aminophenyl-4-aminobenzene, N,N-bis(4-aminophenyl)terephthalamide, 4,4'-diaminodiphenyl sulfone, m-tolidine, o-tolidine, 4,4'-bis(aminophenoxy)biphenyl, 2-(4-aminophenyl)-6-aminobenzoxazole, 3,5-diaminobenzoic acid, 4,4'-diamino-3,3'-dihydroxybiphenyl and 4,4'-methylenebis(cyclohexaneamine).

Sequence in Polyamic Acid

The sequence of the structural units 1 and 2 in the polyamic acid may be random or block. The polyamic acid may be a block copolymer having a first segment which contains the structural unit 1 and does not contain the structural unit 2, and a second segment containing the structural unit 2. Examples of the sequence of blocks in a block copolymer include an AB type sequence in which the second segment is bonded to one end of the first segment; an ABA type sequence in which the second segment is bonded to both ends of the first segment; and an $(AB)_n$ type sequence in which the first segment and the second segment are arranged alternately. The block copolymer may have an ABA type triblock structure because it is easy to polymerize the polyamic acid, and a block structure is easily formed.

When only TFMB and the silicone diamine are used as diamine components in the polyamic acid, the first segment is a segment composed of a plurality of repeated structural unit 1. When a diamine other than TFMB and the silicone diamine is used as a diamine component, the content of the structural unit 1 in the first segment may be 60 mol % or more, such as 70 mol % or more, 80 mol % or more.

The second segment may be composed of only the structural unit 2, or may contain the structural unit 1 and the structural unit 2. Since the silicone diamine has a high molecular weight (specifically, m in the general formula (3) is 51 or more) and has a long-chain silaxane structure, microdomains similar to those of a block structure can be formed even when a plurality of structural unit 2 are not continuous.

When a polyamic acid containing a long-chain siloxane structure in which the number of repeating units (m) is 51 or more, as the structural unit 2, is imidized on an inorganic support such as glass to form a polyimide film, residual stress in a laminate of the inorganic support and the polyimide film tends to decrease. Although the detailed mechanism thereof is not clear, it can be considered that presence of silicone (long-chain siloxane)-derived domains in the polyimide film reduces residual stress in the entire polyimide film because at the time of stress is generated in the polyimide film, the silicone-derived domains undergo micro plastic deformation to relax the stress.

In particular, when the polyamic acid and the polyimide are block copolymers, and contain a domain (second segment) and a continuous phase (first segment), and there is a difference in elastic modulus between the domain and the continuous phase, stress is concentrated on the domain formed by the second segment to effectively relax the stress. When compatibility between a component forming the domain and a component forming the continuous phase is high, a clear interface is not formed, and the domain and the continuous phase are partially compatible with each other, so that stress concentration on the domain tends to hardly occur, leading to reduction of the stress relaxation effect. When the domain of the second segment is partially compatible with the continuous phase, the glass transition temperature (Tg) tends to shift to lower temperatures because silicone has a low glass transition temperature. Thus, it is preferable that the silicone-derived domain (second segment) has low compatibility with the polyamic acid and the continuous phase of the polyimide. As described above, when the polyamic acid is a block copolymer having the first segment which does not contain the structure 2, the compatibility between the first segment and the second segment is low, and therefore a phase separation structure is easily formed.

When the polyamic acid is a block copolymer, the polyimide obtained by imidization of the polyamic acid may be phase-separated to the extent that the first segment and the second segment have glass transition temperatures independent of each other, and it is not necessarily required to have a complete block property. The polyamic acid may contain a segment other than the first segment and the second segment as long as the independent glass transition temperatures Tg of the first segment and the second segment are not affected.

Synthesis of Polyamic Acid

A polyamic acid can be obtained by reaction of diamine and tetracarboxylic dianhydride in an organic solvent. For example, the diamine may be dissolved or dispersed in a slurry form in an organic solvent to obtain a diamine solution, followed by adding the tetracarboxylic dianhydride to the diamine solution in a state of a solid or a solution in which the tetracarboxylic dianhydride is dissolved or dispersed in a slurry form in an organic solvent. The diamine may be added to a tetracarboxylic dianhydride solution.

The organic solvent to be used in the synthesis of polyamic acid is not particularly limited. The organic solvent is preferably one that can dissolve the tetracarboxylic dianhydride and diamine to be used and can dissolve the polyamic acid to be generated by polymerization. Specific examples of the organic solvent to be used in the synthesis reaction of polyamic acid include urea-based solvents such as tetramethylurea and N, N-dimethylethylurea; sulfoxide-based or sulfone-based solvents such as dimethyl sulfoxide, diphenyl sulfone, and tetramethylsulfone; ester-based solvents such as N,N-dimethylacetamide (DMAC), N,N-dimethylformamide (DMF)N,N'-diethylacetamide, N-methyl-2-pyrrolidone (NMP), γ-butyrolactone; amide-based solvents such as hexamethylphosphoric triamide; alkyl halide-based solvents such as chloroform and methylene chloride; aromatic hydrocarbon-based solvents such as benzene and toluene; phenol-based solvents such as phenol and cresol: ketone-based solvents such as cyclopentanone; and ether-based solvents such as tetrahydrofuran, 1,3-dioxolane, 1,4-dioxane, dimethyl ether, diethyl ether, and p-cresol methyl ether. Usually; these solvents are used singly but two or more kinds may be appropriately combined if necessary. In order to enhance the solubility and reactivity of the polyamic acid, the organic solvent to be used in the synthesis reaction of polyamic acid may be selected from amide-based solvents, ketone-based solvents, ester-based solvents, and ether-based solvents, and amide-based solvents such as DMF, DMAC, and NMP are particularly preferable. For improving the stability, an ether-based solvent such as diethylene glycol or tetrahydrofuran may be added.

When a polyamic acid is synthesized using the diamine and the tetracarboxylic dianhydride, a polyamic acid copolymer having a plurality of types of structural units can be obtained by using a plurality of types for one or both of the diamine and the tetracarboxylic dianhydride, and adjusting the amounts thereof. By using TFMB and silicone diamine as diamines, a polyamic acid having the structural unit 1 and the structural unit 2 can be obtained. By changing the ratio of TFMB and silicone diamine, the ratio of the structural unit 1 and the structural unit 2 in the polyamic acid can be arbitrarily adjusted. Similarly, by using a plurality of tetracarboxylic dianhydrides, a polyamic acid having a plurality of types of organic groups X can be obtained. For example, by using PMDA and BPAF as tetracarboxylic dianhydrides, a polyamic acid having the structure (A) and the structure (C) as tetravalent organic groups X can be obtained. By blending two or more polyamic acids, a polyamic acid containing a plurality of tetracarboxylic dianhydrides and diamines can be obtained.

In one or more embodiments, dissolution and reaction of the diamine and tetracarboxylic dianhydride are carried out in an atmosphere of an inert gas such as argon or nitrogen. The temperature condition for reaction of the diamine and the tetracarboxylic dianhydride is not particularly limited, and may be, for example, 25° C. to 150° C., 40 to 150° C., 60 to 120° C., from the viewpoint of allowing reaction of silicone diamine to sufficiently proceed, and suppressing decomposition of the polyamic acid. The reaction time may be arbitrarily set within the range of for example, 10 minutes to 30 hours. As the reaction proceeds, the molecular weight of the polyamic acid increases, and the viscosity of the reaction solution rises.

Fluorine-containing diamines such as TFMB have a lower reaction rate as compared to fluorine-free aromatic diamines. The reaction rate can be raised by increasing the concentrations of tetracarboxylic dianhydride and diamine in the reaction solution. The concentration of the raw materials (diamine and tetracarboxylic dianhydride) in the reaction solution may be 15 to 30 wt %.

The block copolymer can be formed by controlling the charging order, the ratio and the synthesis order of the tetracarboxylic dianhydride and the diamine. A polyamic acid having a first segment and a second segment can be obtained, for example, by preparing a polyamic acid of the first segment (polyamic acid which contains the structural unit 1 and does not contain the structural unit 2) and polyamic acid of the second segment (polyamic acid containing structural unit 2) separately, followed by mixing the polyamic acids. In this case, when the end of one segment is an amino group and the end of the other segment is an acid anhydride group, the amino group at the end of one segment reacts with the acid anhydride group at the end of the other segment, and therefore a block copolymer can be obtained in which a first segment and a second segment are bonded to each other. Alternatively, both segments may be terminated with amino groups or acid anhydride groups, followed by adding a tetracarboxylic dianhydride or a diamine in a corresponding molar ratio to form a bond between the segments.

An ABA type triblock copolymer with a second segment bonded to both ends of a first segment can be obtained by preparing a polyamic acid of the first segment having an acid anhydride group at the end, and adding a silicone diamine. First, a first segment is formed by reacting a tetracarboxylic dianhydride with a first diamine in an organic solvent. The first diamine is a component other than the silicone diamine, among the diamines forming the polyamic acid, and contains TFMB. The first diamine may be composed of only TFMB, or may contain TFMB and a diamine other than the silicone diamine.

The amount (total number of moles) of the tetracarboxylic dianhydride at the time of forming the first segment may be larger than the amount (total number of moles) of the first diamine. Since the amount of the tetracarboxylic dianhydride is large, a polyamic acid having an acid anhydride group at the end (first segment) is formed. On the other hand, when the introduced amount of the tetracarboxylic dianhydride is excessively large, the molecular weight increase of the first segment may be insufficient. In formation of the first segment, the total number of moles of tetracarboxylic dianhydride may be more than 1.000 times, equal to or more than 1.01 times and less than 1.10 times, equal to or more than 1.03 times and equal to or less than 1.08 times the total number of moles of the first diamine.

When the second diamine is added after formation of the first segment by reaction of the tetracarboxylic dianhydride with the first diamine, the acid anhydride group at the end of the first segment reacts with the second diamine to obtain a polyamic acid having residues of the second diamine at both ends. When a part of the tetracarboxylic dianhydride remains unreacted during the formation of the first segment, the second segment is extended at both ends of the first segment by reaction of the unreacted tetracarboxylic dianhydride with the second diamine. After formation of the first segment, the tetracarboxylic dianhydride, in addition to the second diamine, may be additionally added.

When the second diamine contains a silicone diamine, a block copolymer can be obtained in which the second segment containing the structural unit 2 is bonded to both ends of the first segment free of the structural unit 2. The second diamine may be composed of only silicone diamine, or may contain a diamine other than the silicone diamine. The second segment may contain a structure derived from the first diamine that has remained unreacted during formation of the first segment.

Polyamic Acid Solution

A polyamic acid solution contains a polyamic acid and a solvent. A solution obtained by reaction of diamine and tetracarboxylic dianhydride can be used as a polyamic acid solution as it is. The concentration of the polyamic acid and the viscosity of the solution may be adjusted by removing a part of the solvent from the polymerization solution or adding a solvent. The solvent to be added may be different from the solvent used in the polymerization of the polyamic acid. A polyamic acid solution may be prepared by dissolving a solid polyamic acid resin obtained by removing the solvent from the polymerization solution in a solvent. As the organic solvent for the polyamic acid solution, amide-based solvents, ketone-based solvents, ester-based solvents, and ether-based solvents are preferable, and among these, amide-based solvents such as DMF, DMAC, and NMP are preferable.

For the purpose of imparting processing characteristics and various functions, and the like, an organic or inorganic low-molecular or high-molecular compound may be added to the polyamic acid solution. Examples of the additive include dyes, pigments, surfactants, leveling agents, plasticizers, silicones, sensitizers, fillers, and fine particles. The polyamic acid solution may contain a photocurable component, a thermosetting component, and a resin component such as a non-polymerizable resin in addition to the polyamic acid.

For the purpose of promoting the imidization reaction, and the like, an imidizing agent and/or a dehydrating agent may be added to the polyamic acid solution. Although the imidizing agent is not particularly limited, tertiary amines may be used, and among these, a heterocyclic tertiary amine, may be used. Examples of the heterocyclic tertiary amine include pyridine, picoline, quinoline and isoquinoline. Examples of the dehydration catalyst include anhydrous acetic acid, propionic anhydride, n-butyric anhydride, benzoic anhydride and trifluoroacetic anhydride.

An imidazole compound may be added to the polyamic acid solution. Imidazole compound is a compound containing 1,3-diazole ring structure such as 1H-imidazole, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, and 1-benzyl-2-phenylimidazole. Among these, 1,2-dimethylimidazole, 1-benzyl-2-methylimidazole, and 1-benzyl-2-phenylimidazole are preferable and 1,2-dimethylimidazole and 1-benzyl-2-methylimidazole are particularly preferable.

The amount of imidazole compound may be about 0.005 to 0.1 mol, 0.01 to 0.08 mol, and 0.015 to 0.050 mol with respect to 1 mol of the amide groups in the polyamic acid. An "amide group in a polyamic acid" means an amide group formed by a polyaddition reaction of diamine with a tetracarboxylic dianhydride. When the amount of imidazole compound is within the above-described range, improvement of the storage stability of the polyamic acid solution as well as improvement of the heat resistance of the polyimide film and reduction of the residual stress in the laminate of the inorganic support and the polyimide film can be expected.

In the case of adding imidazole compound, the imidazole compound may be added after polymerization of the polyamic acid. To the polyamic acid solution, the imidazole compound may be added as they are or as a solution.

A silane coupling agent may be added to the polyamic acid solution for the purpose of developing proper adhesive property to the support, and the like. The kind of silane coupling agent is not particularly limited, but a silane coupling agent containing an amino group may be used from the viewpoint of reactivity with the polyamic acid.

From the viewpoint of suppressing a decrease in the molecular weight of the polyamic acid, the amount of silane coupling agent added may be 0.5 part by weight or less, 0.1 part by weight or less, and 0.05 part by weight or less with respect to 100 parts by weight of the polyamic acid. Since the polyimide film formed by imidization of the polyamic acid having the structural unit 2 is excellent in adhesion with the support sufficient adhesion is exhibited even when a silane coupling agent is not added. In a case where a silane coupling agent is used for the purpose of improving the adhesive property between the polyimide film and the support, and the amount of silane coupling agent added may be 0.01 part by weight or more with respect to 100 parts by weight of the polyamic acid.

Polyimide and Polyimide Film

A polyimide is obtained by cyclodehydration of a polyamic acid. Cyclodehydration can be performed by an azeotropic method using an azeotropic solvent, a thermal method, or a chemical method. The imidization from a polyamic acid to a polyimide can be performed at an arbitrary proportion of 1% to 100%, and a partially imidized polyamic acid may be synthesized.

In order to obtain a polyimide film, a method may be used in which a polyamic acid solution is applied on a support such as glass plate, metal plate and PET (polyethylene terephthalate) film, in a film shape, and the polyamic acid is cyclodehydrated by heating. In order to shorten the heating time and develop the properties, an imidizing agent and/or a dehydration catalyst may be added to the polyamic acid solution as described above. For adapting to a batch type process for producing a device, a glass substrate may be used as a support such as alkali-free glass.

In the formation of a polyimide film on a support, a polyamic acid solution is first applied on the support to form a coating film and the laminate of the support and the coating film of polyamic acid is heated at a temperature of 40° C. to 200° C. for 3 to 120 minutes to remove the solvent. Drying may be performed at two or more stages of temperature, for example, at 50° C. for 30 minutes and then at 100° C. for 30 minutes.

As the laminate of the support and the polyamic acid is heated at a temperature of 200° C. to 400° C. for 3 to 300 minutes, the polyamic acid is cyclodehydrated, and a laminate in which a polyimide film is disposed on a support is obtained. At this time, it is preferable to gradually raise the temperature from a low temperature to a high temperature and then from the high temperature to the maximum temperature. The rate of temperature rise may be 2° C. to 10° C./min or 4° C. to 10° C./min. The maximum temperature may be 250° C. to 400° C. Imidization sufficiently proceeds when the maximum temperature is 250° C. or more, and thermal deterioration and coloring of polyimide can be suppressed when the maximum temperature is 400° C. or less. In heating for imidization, the laminate may be maintained at an arbitrary temperature for an arbitrary time until the temperature reaches the maximum temperature.

The heating atmosphere may be any of air, reduced pressure, or an inert gas such as nitrogen. In order to develop higher transparency; heating may be performed under reduced pressure or in an inert gas. Examples of the heating apparatus include a hot air oven, an infrared oven, a vacuum oven, an inert oven, and a hot plate.

Properties of Polyimide and its Usage

The polyimide may be subjected to a coating or molding process for fabricating a product or a member as it is. As described above, the polyimide can be formed into a polyimide film molded in a film shape. Various inorganic thin-films such as metal oxides and transparent electrodes may be formed on the surface of the polyimide film. The methods for forming these inorganic thin-films are not particularly limited, and examples thereof include a CVD method, a sputtering method, a vacuum deposition method, and a PVD method such as an ion plating method.

The polyimide film of one or more embodiments of the present invention exhibits heat resistance, transparency and low thermal expansion property thus can be utilized as an alternative material for glass, and can be applied to printed matters, color filters, flexible displays, optical films, image display devices such as liquid crystal display devices, organic EL, and electronic paper, 3D displays, touch panels, transparent conductive film substrates, solar cells and the like. In these applications, the thickness of the polyimide film may be, for example, about 1 to 200 μm or about 5 to 100 μm.

Since the polyimide film of one or more embodiments of the present invention gives a laminate having small residual stress when disposed on a glass support, a batch type process for preparing a device can be applied in which a polyamic acid solution is applied onto a support, heated to perform imidization, an electronic element or the like is formed on a polyimide film of a laminate, and the polyimide film is peeled from the support.

In the batch type process for preparing a device, a laminate in which a polyimide film is closely laminated on a support is formed by applying a polyamic acid solution onto a support and applying heat to perform imidization through the above-described method. An electronic element such as a TFT is formed on the polyimide film of the laminate. In formation of a TFT element, an oxide semiconductor, amorphous silicon and the like are generally formed at a high temperature of 300° C. or higher.

When the thermal decomposition temperature of the polyimide film is low, heating during formation of an element may cause generation of outgas from the polyimide film, resulting in performance deterioration and peeling of the element formed on the polyimide film. Thus, the 1% weight-reduction temperature Td1 of the polyimide film may be 450° C. or higher. Imidization of a polyamic acid having the structural unit 1 and the structural unit 2 enables formation of a polyimide film having excellent heat resistance and Td1 of 450° C. or higher. Td1 of the polyimide film may be as high as possible, and may be 455° C. or higher, 460° C. or higher, or 465° C. or higher.

When the glass transition temperature of the polyimide film is lower than the process temperature during formation of an electronic element, stress may be generated at an interface between the support and the polyimide film due to a dimensional change at the time of cooling during formation of the element and after formation of the element, resulting in warpage and breakage. Thus, Tg of the polyimide film may be 300° C. or higher, 350° C. or higher, 360° C. or higher.

Since in general, the coefficient of thermal expansion of glass is smaller than that of resin, stress is generated at the interface between the support and the polyimide film in the laminate due to a temperature change at the time of heating during formation of an electronic element and subsequent cooling. When stress remains at the interface between the support and the polyimide film formed on the support, shrinkage of the polyimide film at the time of cooling to normal temperature after heating a high temperature in, for example, a process for forming an electronic element may cause problems such as warpage of the laminate, breakage of the glass support, and peeling of the flexible substrate (polyimide film) from the glass support.

The polyimide film produced by using the polyamic acid solution of one or more embodiments of the present invention has heat resistance, transparency and a low thermal expansion property, and enables reduction of residual stress in a laminate with a glass support. The residual stress in the laminate of the support and the polyimide film may be 30 MPa or less, 25 MPa or less, 20 MPa or less.

In a batch type device fabricating process, the adhesive property between the support and the polyimide may be high in order to accurately form or mount an electronic element and the like on the polyimide film. The 90° peel strength of the polyimide film from the support on which the polyimide film is adhesively laminated may be 0.05 N/cm or more or 0.1 N/cm or more. On the other hand, the peel strength is 0.25 N/cm or less from the viewpoint of workability when peeling off the polyimide film from the support after mounting, and the like.

A method for peeling off the polyimide film from the support is not particularly limited. For example, the polyimide film may be peeled off from the support by hand or using a peeling device such as a driving roll, a robot, or the like. The peeling may also be performed by lowering the adhesion between the support and the polyimide film. For example, the polyimide film may be formed on a support provided with a release layer. It is also possible to promote the peeling by forming a silicon oxide film on a substrate having a large number of grooves and infiltrating with an etching solution. The peeling may also be performed by laser irradiation.

When the support and the polyimide are peeled off from each other by laser irradiation, the polyimide film needs to absorb laser. Therefore, a cutoff wavelength (a wavelength at which a transmittance is 0.1% or less) of the polyimide film is required to be longer than a wavelength of the laser used for the peeling. XeCl excimer laser having a 308 nm wavelength is often used in laser peeling, and thus the cutoff wavelength of the polyimide film may be 320 nm or more or 330 nm or more. On the other hand, the polyimide film tends to be colored yellow when the cutoff wavelength is a long wavelength, and thus the cutoff wavelength may be 390 nm or less. From the viewpoint of achieving both transparency (low yellow index) and laser peeling processability, the cutoff wavelength of the polyimide film may be 320 to 390 nm or 330 to 380 nm.

The transparency of the polyimide film can also be evaluated, for example, by a total light transmittance and a haze according to JIS K7105-1981. The total light transmittance of the polyimide film may be 80% or more, or 85% or more. The haze of the polyimide film is 1.5% or less, 1.2% or less, or 1.0% or less. In applications such as displays, the transmittance is required to be high in the entire visible light wavelength region. The yellow index (YI) of the polyimide film may be 15 or less or 10 or less. YI can be measured in conformity with JIS K7373-2006. Such a highly transparent polyimide film can be used as a transparent substrate for glass alternative applications, etc.

Examples of flexible device having a polyimide film as a substrate includes organic EL display and organic EL lighting. Organic EL devices can be classified into two types, i.e., bottom emission type in which light is extracted exits through is emitted from a substrate-side and top emission type in which light is extracted from a side opposite to the substrate. Transparent polyimide film having high transparency and low YI is also suitable for a substrate material of bottom emission type organic EL device.

In a bottom emission type organic EL device, light exits through a substrate, and therefore the substrate material may be required to have not only transparency, but also optical isotropy and hence a thickness-direction retardation (Rth) originating in birefringence is small, from the viewpoint of improving visibility. Similarly the touch panel substrate may be required to have a small Rth. Specifically, where the thickness of the polyimide film is 10 μm, the retardation Rth may be 300 nm or less, 200 nm or less, 100 nm or less, or 50 nm or less. Rth is a product of the thickness-direction birefringence (a difference between the in-plane average refractive index and the thickness-direction refractive index) and the thickness. In other words, the thickness-direction birefringence of the polyimide film may be 0.03 or less, 0.02 or less, 0.01 or less, or 0.005 or less. For example, when the ratio of tetracarboxylic dianhydrides having a fluorene backbone, such as BPAF, among tetracarboxylic dianhydride components of the polyamic acid and the polyimide, is increased, the birefringence of the polyimide film tends to decrease.

EXAMPLES

Hereinafter, one or more embodiments of the present invention will be described more in detail by way of examples, which are illustrative, and should not be construed as limiting one or more embodiments of the present invention.

Evaluation Methods

Transmittance

The light transmittance of the polyimide film at 200 to 800 nm was measured using an ultraviolet visible near-infrared spectrophotometer ("V-650" manufactured by JASCO Corporation), and the yellow index (YI) was calculated from the expression specified in JIS K 7373.

Glass Transition Temperature (Tg)

Measurement was performed using a thermomechanical analyzer ("TMA/SS7100" manufactured by Hitachi High-Tech Science Corporation). A load of 98.0 mN was applied to a sample having a width of 3 mm and a length of 10 mm, the temperature was raised from 20° C. to 450° C. at 10° C./min, and the temperature and the strain amount (elongation) were plotted (TMA curve). The intersection point extrapolated from the tangent line of the TMA curve before and after the slope changed was defined as a glass transition temperature.

Haze

In accordance with the method specified in JIS K7136, the haze was measured with an integrating sphere haze meter ("HM-150N" manufactured MURAKAMI COLOR RESEARCH LABORATORY CO., LTD).

Residual Stress

On an alkali-free glass (thickness: 0.7 mm, 100 mm×100 mm) manufactured by Corning Incorporated, whose warpage amount had been measured in advance, a polyamic acid solution prepared in each of Examples and Comparative Examples was applied using a spin coater and heated at 80° C. for 30 minutes in the air and at 380° C. for 60 minutes in a nitrogen atmosphere to obtain a laminate in which a polyimide film having a thickness of 10 μm was disposed on a glass substrate. The laminate was dried at 120° C. for 10 minutes to eliminate an influence of water absorbance of the polyimide film, and then the amount of warpage of the laminate was measured in a nitrogen atmosphere at 25° C. using a thin-film stress measuring device (FLX-2320-S)

manufactured by KLA Corporation, and the residual stress generated between the glass substrate and the polyimide film was evaluated.

Retardation (Rth)

The thickness-direction retardation Rth with respect to light having a wavelength of 590 nm was measured with a phase difference meter "OPTIPRO" manufactured by SHIN-TECH.

1% Weight-Reduction Temperature (Td1)

Measurement was performed using "TG/DTA/7200" manufactured by SII NanoTechnology Inc. The temperature was raised from 25° C. to 500° C. at 20° C./min in a nitrogen atmosphere, the temperature at which the weight decreased by 1% was defined as Td1 of the polyimide film.

Abbreviations of Compounds and Reagents

In the following, compounds and reagents are represented by the following abbreviations.

Solvent

NMP: 1-methyl-2-pyrrolidone
DGDE: diethylene glycol diethyl ether

Tetracarboxylic Dianhydride

BPDA: 3,3'-4,4'-biphenyltetracarboxylic dianhydride
PMDA: pyromellitic dianhydride
BPAF: 9,9-bis(3,4-dicarboxyphenyl)fluorenic dianhydride
TMHQ: 1,4-phenylenebis(trimellitate dianhydride)
6FDA: 4,4'-(hexafluoroisopropylidene)diphthalic anhydride
ODPA: 4,4'-oxydiphthalic dianhydride

Diamine

TFMB: 2,2'-bis(trifluoromethyl)benzidine
4,4'-DDS: 4,4'-diaminodiphenyl sulfone

Silicone Diamines Each of which is a Dimethyl Silicone Modified at Both Ends (Manufactured by Shin-Etsu Chemical Co., Ltd.)

X-22-1660B-3: a compound in which $R^2$ in the general formula (3) consists of methyl and phenyl, where the ratio of phenyl is 25 mol %, and m is 40; Mw=4400
KF-8010: a compound in which $R^2$ in the general formula (3) is methyl, and m is 9 to 10; Mw=860
KF-8012: a compound in which $R^2$ in the general formula (3) is methyl, and m is 57 to 65; Mw=4400 to 5000
KF-8008: a compound in which $R^2$ in the general formula (3) is methyl, and m is 145 to 159; Mw=11000 to 12000

Imidazole

DMI: 1,2-dimethylimidazole

Example 1

Preparation of Polyamic Acid Solution

A 300 mL glass separable flask equipped with a stirrer having a stainless steel stirring rod, and a nitrogen inlet tube was charged with 40.00 g of NMP, 4.741 g of TFMB, and the mixture was stirred. 1.695 g of PMDA was added to this solution, the mixture was stirred for 10 minutes or more, 3.563 g of BPAF was then added, and the mixture was stirred at room temperature for 12 hours. To this solution (solid content concentration: 25 wt %) was added NMP to dilute the solution to a solid content concentration of 15 wt %. The solution was heated in an oil bath at 80° C. for 5 minutes, and 2.0 g (20 parts by weight based on a total of 100 parts by weight of the diamine (TFMB) and the tetracarboxylic dianhydride (PMDA and BPAF)) of KF-8012 diluted to 10 wt % with DGDE was slowly added dropwise. The mixture was stirred for 30 minutes, and then rapidly cooled with ice water to obtain a uniform and transparent polyamic acid solution.

Formation of Polyimide Film

The polyamic acid solutions was applied on a glass plate using a spin coater and heated at 80° C. for 30 minutes in the air and at 380° C. for 1 hour in a nitrogen atmosphere to form polyimide films having a thickness of 10 to 15 sm.

Example 2

A polyamic acid solution was prepared in the same manner as in Example 1, and 0.36 g (3 parts by weight based on a total of 100 parts by weight of the diamine, the tetracarboxylic dianhydride and the silicone diamine) of DMI diluted to 10 wt % with DGDE was added. This solution was applied and heated in the same manner as in Example 1 to obtain a polyimide film.

Example 3

As the silicone diamine, 2.0 g of KF-8008 was used instead of 2.0 g of KF-8012. Except for the above, the same procedure as in Example 1 was carried out to prepare a polyamic acid solution and a polyimide film was obtained.

Examples 4, 6 and 9

The ratio of PMDA and BPAF was changed to the ratio shown in Table 1. Except for the above, the same procedure as in Example 1 was carried out to prepare a polyamic acid solution and for a polyimide film.

Examples 5 and 7

The ratio of PMDA and BPAF was changed to the ratio shown in Table 1. Except for the above, the same procedure as in Example 2 was carried out to prepare a polyamic acid solution including an imidazole compound and to form a polyimide film.

Examples 8 to 12 and Comparative Examples 1 to 10

The types and amounts of the diamine and the tetracarboxylic dianhydride and the types of the silicone diamine were changed as shown in Table 1. Except for the above, the same procedure as in Example 1 was carried out to prepare a polyamic acid solution and for a polyimide film.

Table 1 shows the compositions of the polyamic acids, and results of evaluating the characteristics of the polyimide films in Examples and Comparative Examples. In Table 1, the amount of tetracarboxylic dianhydride (mol %) in Table 1 is a value based on a total of 100 mol % of the diamine, the amount of the silicone diamine (phr) is a value based on 100 parts by weight of the total amount of the diamine and the tetracarboxylic acid, and the amount of 1,2-dimethyl-imidazole (DMI) is a value based on 100 parts by weight of the total amount of the diamine, the tetracarboxylic dianhydride and the silicone diamine. All the polyimide films of Examples and Comparative Examples had a haze of less than 1%.

TABLE 1

| | Composition of polyamic acid | | | | | | | |
|---|---|---|---|---|---|---|---|---|
| | Tetracarboxylic dianhydride [mol %] | | | | | | Diamine [mol %] | |
| | PMDA | BPAF | BPDA | ODPA | 6FDA | TMHQ | TFMB | 4,4'-DDS |
| Example 1 | 52.5 | 52.5 | — | — | — | — | 100 | — |
| Example 2 | 52.5 | 52.5 | — | — | — | — | 100 | — |
| Example 3 | 52.5 | 52.5 | — | — | — | — | 100 | — |
| Example 4 | 62.5 | 42.5 | — | — | — | — | 100 | — |
| Example 5 | 62.5 | 42.5 | — | — | — | — | 100 | — |
| Example 6 | 67.5 | 37.5 | — | — | — | — | 100 | — |
| Example 7 | 67.5 | 37.5 | — | — | — | — | 100 | — |
| Example 8 | 67.5 | 37.5 | — | — | — | — | 90 | 10 |
| Example 9 | 72.5 | 32.5 | — | — | — | — | 100 | — |
| Example 10 | 67.5 | — | — | — | 37.5 | — | 100 | — |
| Example 11 | — | 32.5 | — | — | — | 67.5 | 100 | — |
| Example 12 | — | 32.5 | 67.5 | — | — | — | 100 | — |
| Comparative Example 1 | 52.5 | 52.5 | — | — | — | — | 100 | — |
| Comparative Example 2 | 62.5 | 42.5 | — | — | — | — | 100 | — |
| Comparative Example 3 | 67.5 | 37.5 | — | — | — | — | 100 | — |
| Comparative Example 4 | 67.5 | 37.5 | — | — | — | — | 100 | — |
| Comparative Example 5 | 67.5 | 37.5 | — | — | — | — | 90 | 10 |
| Comparative Example 6 | 72.5 | 32.5 | — | — | — | — | 100 | — |
| Comparative Example 7 | 67.5 | — | — | 37.5 | — | — | 100 | — |
| Comparative Example 8 | 67.5 | — | — | — | 37.5 | — | 100 | — |
| Comparative Example 9 | — | 32.5 | — | — | — | 67.5 | 100 | — |
| Comparative Example 10 | — | 32.5 | 67.5 | — | — | — | 100 | — |

| | Composition of polyamic acid | | | | | Properties of polyimide film | | | | |
|---|---|---|---|---|---|---|---|---|---|---|
| | Silicone diamine [phr] | | | | | | | | | |
| | KF-8008 | KF-8012 | KF-8010 | x-22-1660 | DMI [phr] | Td1 [° C.] | Tg [° C.] | stress [MPa] | Rth [nm] | YI [—] |
| Example 1 | — | 20 | — | — | — | 466 | 385 | 29 | 10 | 9 |
| Example 2 | — | 20 | — | — | 3 | 471 | 395 | 24 | 80 | 6 |
| Example 3 | 20 | — | — | — | — | 464 | 390 | 24 | 30 | 6 |
| Example 4 | — | 20 | — | — | — | 461 | 395 | 25 | 40 | 7 |
| Example 5 | — | 20 | — | — | 3 | 469 | 397 | 22 | 160 | 7 |
| Example 6 | — | 20 | — | — | — | 470 | 390 | 23 | 160 | 8 |
| Example 7 | — | 20 | — | — | 3 | 470 | 400 | 18 | 190 | 7 |
| Example 8 | — | 20 | — | — | — | 469 | 389 | 29 | 80 | 8 |
| Example 9 | — | 20 | — | — | — | 459 | 395 | 21 | 280 | 9 |
| Example 10 | — | 20 | — | — | — | 460 | 354 | 22 | 300 | 5 |
| Example 11 | — | 20 | — | — | — | 454 | 311 | 27 | 110 | 9 |
| Example 12 | — | 20 | — | — | — | 460 | 347 | 22 | 20 | 5 |
| Comparative Example 1 | — | — | — | 20 | — | 437 | 377 | 31 | 10 | 9 |
| Comparative Example 2 | — | — | — | 20 | — | 440 | 384 | 30 | 80 | 6 |
| Comparative Example 3 | — | — | — | 20 | — | 430 | 374 | 27 | 200 | 8 |
| Comparative Example 4 | — | — | 20 | — | — | 441 | 288 | 35 | 100 | 16 |
| Comparative Example 5 | — | — | — | 20 | — | 445 | 384 | 28 | 90 | 6 |
| Comparative Example 6 | — | — | — | 20 | — | 439 | 383 | 27 | 280 | 9 |
| Comparative Example 7 | — | — | — | 20 | — | 436 | 379 | 28 | 100 | 10 |

TABLE 1-continued

| | | | | | | | | | | |
|---|---|---|---|---|---|---|---|---|---|---|
| Comparative Example 8 | — | — | — | 20 | — | 441 | 355 | 23 | 300 | 4 |
| Comparative Example 9 | — | — | — | 20 | — | 441 | 310 | 27 | 130 | 7 |
| Comparative Example 10 | — | — | — | 20 | — | 439 | 343 | 26 | 40 | 5 |

As shown in Table 1, the polyimide films of all Examples using a silicone diamine containing a long-chain siloxane structure in which the number of repeating siloxane structural units (m) is 51 or more had Td1 of 450° C. or higher and Tg of 300° C. or higher, and exhibited excellent heat resistance. The laminates of the polyimide film and the glass plate in Examples all had a residual stress of 30 MPa or less. Comparison between Example 1 and Example 2, comparison between Example 4 and Example 5 and comparison between Example 6 and Example 7 showed that addition of imidazole compound to the polyamic acid solution tended to improve the heat resistance of the polyimide film and reduce the residual stress in the laminate.

The polyimide films of all Comparative Examples using a silicone diamine having a small number of repeating units (m) had Td1 of lower than 450° C. In Comparative Example 4, Tg markedly decreased, and the transparency of the film was deteriorated. These results show that the polyimide film containing a long-chain siloxane structure is excellent in transparency and heat resistance, and suitable for a substrate material of a flexible device.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A polyamic acid, comprising:
a structural unit represented by general formula (1);
and a structural unit represented by general formula (2),

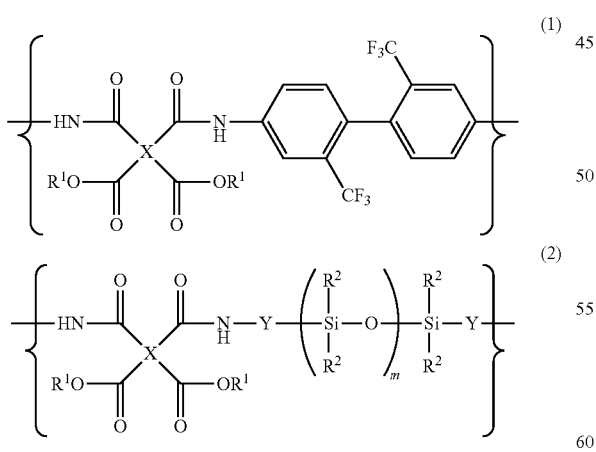

wherein:
a plurality of $R^1$s are each independently a hydrogen atom, an alkyl group, or an aryl group,
a plurality of $R^2$s are each independently an alkyl group having 1 to 3 carbon,
X is a tetravalent organic group,
a plurality of Ys are each independently an alkylene group having 1 to 3 carbon atoms, or an arylene group,
m is an integer of 51 to 199,
in the general formulas (1) and (2), X comprises:
at least one selected from the group consisting of a tetravalent organic group represented by formula (A) and a tetravalent organic group resented by formula (B); and
a tetravalent organic group represented by formula (C), and
the tetravalent organic group represented by formula (C) is comprised in an amount of 30 mol % or more with respect to a total amount of X

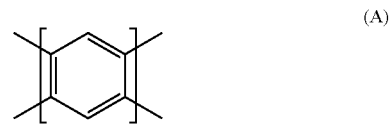
(A)

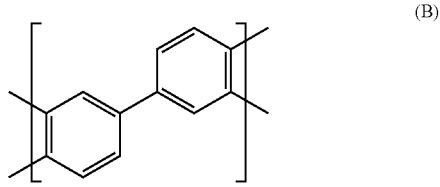
(B)

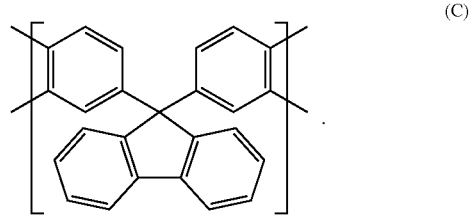
(C)

2. The polyamic acid according to claim 1, wherein in the general formula (2), each of the plurality of $R^2$s is a methyl group and each of the plurality of Ys is a propylene group.

3. The polyamic acid according to claim 1, wherein the polyamic acid is a block copolymer comprising a first segment and a second segment, wherein the first segment contains the structural unit represented by the general formula (1) and does not contain the structural unit represented by the general formula (2), and wherein the second segment contains the structural unit represented by the general formula (2).

4. The polyamic acid according to claim 3,
wherein the polyamic acid is an ABA type triblock copolymer in which the second segment is bonded to both ends of the first segment.

5. A method for producing the polyamic acid according to claim 1, comprising:
reacting a tetracarboxylic dianhydride and a diamine in an organic solvent.

6. The method for producing the polyamic acid according to claim 5, comprising:
reacting the tetracarboxylic dianhydride and a first diamine in the organic solvent to form a polyamic acid segment; and
adding a second diamine,
wherein, the first diamine includes 2,2'-bis(trifluoromethyl)benzidine, and the second diamine is a silicone diamine represented by a general formula (3):

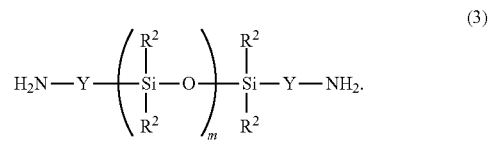

wherein $R^2$, Y and m in the general formula (3) are identical, respectively, to $R^2$, Y and m in the general formula (2).

7. The method for producing the polyamic acid according to claim 6,
wherein a total number of moles of the tetracarboxylic dianhydride is equal to or more than 1.01 times and less than 1.10 times a total number of moles of the first diamine.

8. A polyamic acid solution, comprising:
the polyamic acid according to claim 1; and
an organic solvent.

9. A polyimide, comprising:
a cyclodehydration product of the polyamic acid according to claim 1.

* * * * *